(12) United States Patent
Tsuji

(10) Patent No.: US 7,203,062 B2
(45) Date of Patent: Apr. 10, 2007

(54) ELECTRONIC APPARATUS WITH AIR COOLING UNIT

(75) Inventor: Hiroyuki Tsuji, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 10/909,489

(22) Filed: Aug. 2, 2004

(65) Prior Publication Data

US 2005/0068732 A1    Mar. 31, 2005

(30) Foreign Application Priority Data

Sep. 30, 2003    (JP) ............................ P2003-339985

(51) Int. Cl.
*H05K 7/20*    (2006.01)
(52) U.S. Cl. ...................... 361/695; 361/681; 361/692; 349/58
(58) Field of Classification Search ................ 361/681, 361/683, 686, 687, 692–697, 725, 731, 759, 361/780; 312/223.2, 223.3; 165/80.3, 121, 165/122, 104.33, 185; 174/15.2, 252; 454/184; 248/917–923
See application file for complete search history.

(56) References Cited

U.S. PATENT DOCUMENTS

| | | | |
|---|---|---|---|
| 5,268,817 A | | 12/1993 | Miyagawa et al. |
| 5,594,619 A | * | 1/1997 | Miyagawa et al. .......... 361/681 |
| 5,731,952 A | | 3/1998 | Ohgami et al. |
| 5,901,035 A | * | 5/1999 | Foster et al. ................. 361/683 |
| 6,005,767 A | | 12/1999 | Ku et al. |
| 6,141,214 A | | 10/2000 | Ahn |
| 6,166,907 A | | 12/2000 | Chien |
| 6,196,850 B1 | | 3/2001 | Dietz et al. |
| 6,231,371 B1 | | 5/2001 | Helot |
| 6,282,082 B1 | | 8/2001 | Armitage et al. |
| 6,296,048 B1 | | 10/2001 | Sauer |
| 6,313,990 B1 | | 11/2001 | Cheon |
| 6,333,847 B1 | | 12/2001 | Katsui et al. |
| 6,377,452 B1 | | 4/2002 | Sasaki et al. |
| 6,396,687 B1 | | 5/2002 | Sun et al. |
| 6,418,017 B1 | | 7/2002 | Patel et al. |
| 6,430,038 B1 | | 8/2002 | Helot et al. |
| 6,437,973 B1 | | 8/2002 | Helot et al. |
| 6,464,195 B1 | | 10/2002 | Hildebrandt |
| 6,473,296 B2 | * | 10/2002 | Amemiya et al. .......... 361/683 |
| 6,477,871 B1 | | 11/2002 | Shaw et al. |
| 6,483,445 B1 | | 11/2002 | England |
| 6,519,143 B1 | | 2/2003 | Goko |

(Continued)

FOREIGN PATENT DOCUMENTS

EP    0834795    4/1998

(Continued)

*Primary Examiner*—Michael Datskovskiy
(74) *Attorney, Agent, or Firm*—Blakely Sokoloff Taylor & Zafman, LLP

(57) ABSTRACT

An electronic apparatus comprises a display that is used both in a horizontal direction and a vertical direction, and a housing connected to the display. The housing includes a heating element therein and includes an exhaust port formed thereon. The electronic apparatus also has a fan arranged inside the housing. The fan is adapted to exhaust air heated by the heating element. The position of the exhaust port is located at an elevated end portion of the housing in any posture of both the horizontal direction and the vertical direction.

16 Claims, 11 Drawing Sheets

U.S. PATENT DOCUMENTS

| | | |
|---|---|---|
| 6,519,147 B2 | 2/2003 | Nakagawa et al. |
| 6,519,148 B2 | 2/2003 | Nakagawa et al. |
| 6,532,152 B1 * | 3/2003 | White et al. .................. 361/692 |
| 6,594,149 B2 | 7/2003 | Yamada et al. |
| 6,625,024 B2 | 9/2003 | Mermet-Guyennet |
| 6,652,223 B1 * | 11/2003 | Horng et al. ............... 415/53.1 |
| 6,654,234 B2 | 11/2003 | Landry et al. |
| 6,717,798 B2 | 4/2004 | Bell et al. |
| 6,728,102 B2 | 4/2004 | Ishikawa et al. |
| 6,741,465 B2 * | 5/2004 | Holalkere et al. ........... 361/687 |
| 6,755,626 B2 | 6/2004 | Komatsu et al. |
| 6,768,637 B1 * | 7/2004 | Amemiya .................... 361/683 |
| 6,774,870 B2 | 8/2004 | Mead, Jr. et al. |
| 6,785,128 B1 * | 8/2004 | Yun .......................... 361/683 |
| 6,804,115 B2 * | 10/2004 | Lai ............................ 361/695 |
| 6,809,927 B2 | 10/2004 | Ohashi et al. |
| 6,829,139 B1 * | 12/2004 | Duarte ........................ 361/681 |
| 6,856,506 B2 | 2/2005 | Doherty et al. |
| 6,873,521 B2 | 3/2005 | Landry et al. |
| 6,924,978 B2 * | 8/2005 | DiStefano .................... 361/688 |
| 6,927,978 B2 * | 8/2005 | Arai et al. .................. 361/695 |
| 7,079,394 B2 * | 7/2006 | Mok .......................... 361/700 |
| 2002/0018337 A1 | 2/2002 | Nakamura |
| 2002/0053421 A1 | 5/2002 | Hisano et al. |
| 2002/0141159 A1 | 10/2002 | Bloemen |
| 2003/0039097 A1 | 2/2003 | Igarashi |
| 2003/0142474 A1 | 7/2003 | Karidis et al. |
| 2004/0057197 A1 | 3/2004 | Hill et al. |
| 2005/0007739 A1 | 1/2005 | Gata |
| 2005/0052833 A1 | 3/2005 | Tanaka et al. |
| 2005/0164624 A1 | 7/2005 | Hisamatsu |

FOREIGN PATENT DOCUMENTS

| | | |
|---|---|---|
| JP | 07-049725 | 2/1995 |
| JP | 07-142886 | 6/1995 |
| JP | 08/046097 | 2/1996 |
| JP | 10-004161 | 1/1998 |
| JP | 10-055227 | 2/1998 |
| JP | 10-261884 | 9/1998 |
| JP | 10/303582 | 11/1998 |
| JP | 11-039058 | 2/1999 |
| JP | 11-166500 | 6/1999 |
| JP | 2000-049478 | 2/2000 |
| JP | 2001-057490 | 2/2001 |
| JP | 2001-230356 | 8/2001 |
| JP | 2001-251079 | 9/2001 |
| JP | 2001-325164 | 11/2001 |
| JP | 2002-099356 | 4/2002 |
| JP | 2002-344186 | 11/2002 |
| JP | 2002-353670 | 12/2002 |
| JP | 2003-044169 | 2/2003 |
| JP | 2003-068317 | 3/2003 |
| JP | 2003-101272 | 4/2003 |
| JP | 2003-172286 | 6/2003 |
| JP | 2003-216278 | 7/2003 |
| JP | 3431024 | 7/2003 |
| JP | 2003-233441 | 8/2003 |
| JP | 3452059 | 9/2003 |
| JP | 2003-343492 | 12/2003 |
| JP | 2004-047921 | 2/2004 |

* cited by examiner

ELECTRONIC APPARATUS WITH AIR COOLING UNIT

CROSS-REFERENCE TO RELATED APPLICATIONS

This application is based upon and claims the benefit of priority from Japanese Patent Application No. 2003-339985, filed Sep. 30, 2003, the entire contents of which are incorporated herein by reference.

BACKGROUND

1. Field

This invention relates to an electronic apparatus with a cooling unit, which is capable of being used in at least two different postures.

2. Description of the Related Art

Recently, some electronic apparatus such as a portable computer have been implemented with a hinge mechanism that enables a display unit supported by a main unit to be reversed by 180 degrees. According to the electronic apparatus, the display unit is supported by the main unit via a horizontal first axis, and may be pivoted (also referred to as "turnable") between a closed position lying on the main unit and an open position erected relevant to the main unit. Further, the display unit is supported reversibly by 180 degrees by the main unit via a second axis orthogonal to the first axis.

Thus, after the display unit at the open position has been reversed by 180 degrees around the second axis, when the display unit is placed in the closed position, the display unit lies on the main unit in an upward direction in which a display screen acts as a tablet for receiving input information. Therefore, a user is able to input information by touching the display screen with a stylus pen.

Japanese Patent Application Publication (KOKAI) No. 11-39058 discloses such an electronic apparatus.

On the other hand, an electronic apparatus such as a personal computer features a CPU for processing information. The increased amount of heat dissipated by the CPU is strongly correlated to the increased processing speed and multi-functionality. If a temperature of this CPU is excessively high, a lowered processing speed may occur. Thus, a conventional electronic apparatus is equipped with an air cooling type cooling unit for forcibly exhausting air heated by the CPU and cooling the CPU itself.

The cooling unit disclosed in Japanese Patent Application Publication (KOKAI) No. 10-124172 comprises a heat sink thermally connected to the CPU, and a fan for feeding air to the heat sink. The air to be fed from the fan is blown to the heat sink, and is heated by heat exchange with the heat sink. The heated air is exhausted from an exhaust port that opens on a side wall or a rear wall of a housing of the electronic apparatus to the outside of the housing.

As for this conventional type of an electronic apparatus, a user can use it in only one posture, i.e. the main body is put on a surface and the display is opened and stood.

On the other hand, the electronic apparatus however disclosed in Japanese Patent Application Publication (KOKAI) No. 11-39058 can be used in two postures. The efficiency of cooling may be changed, depending on the postures. Considering the recent high performance electronic apparatus, it is important to cool inside the apparatus efficiently. However, this does not show how to exhaust heated air.

BRIEF DESCRIPTION OF THE SEVERAL VIEWS OF THE DRAWINGS

The accompanying drawings, which are incorporated in and constitute a part of the specification, illustrate embodiments of the invention, and together with the detailed description of the embodiments given below, serve to explain the principles of the invention.

DETAILED DESCRIPTION

Figure 1:
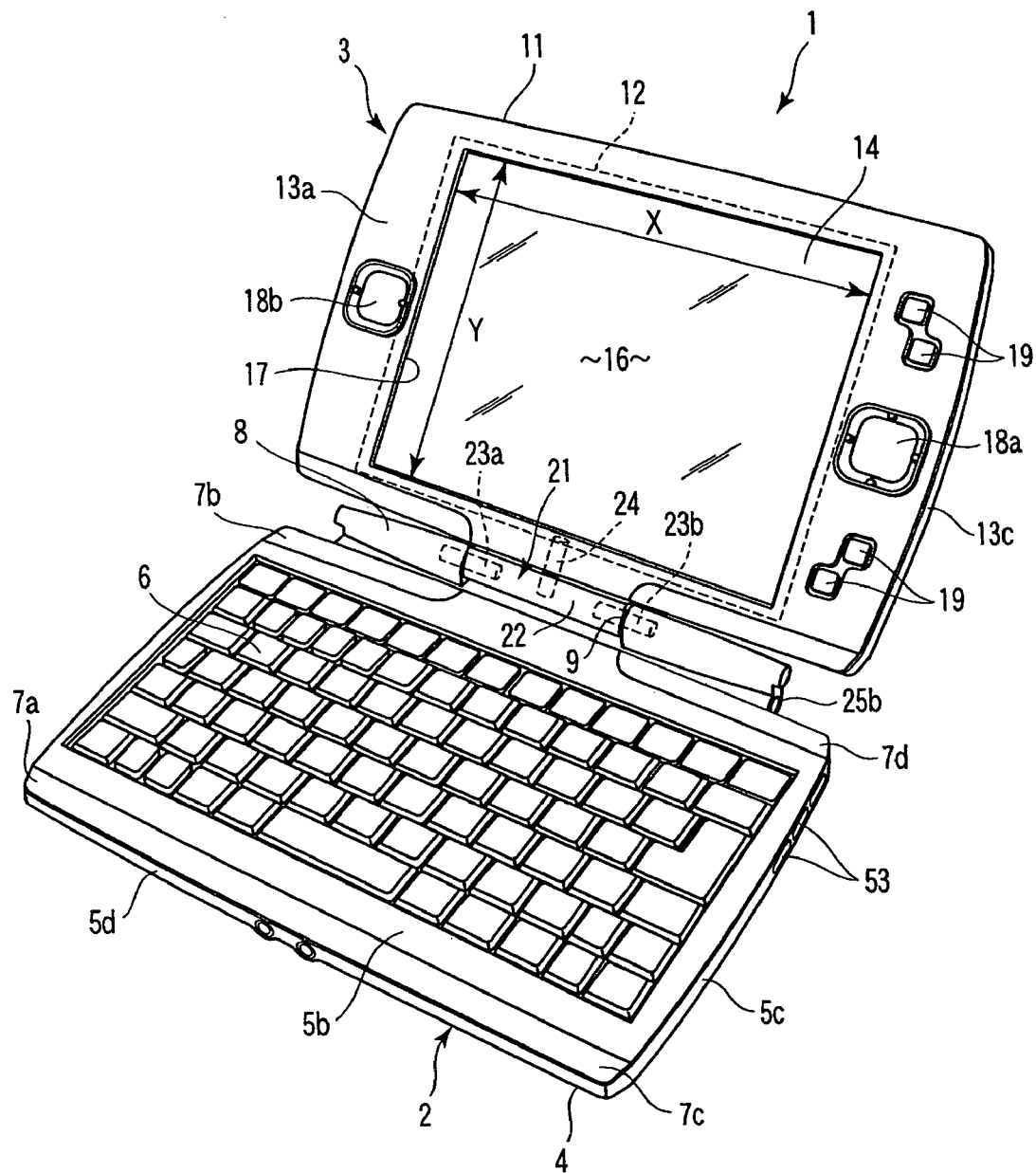
FIG. 1 is an exemplary perspective view of a portable information apparatus according to a first embodiment of the present invention.

Various embodiments according to the present invention will be described hereinafter with reference to the accompanying drawings. In general, according to one embodiment of the invention, an electronic apparatus comprises a display that is used both in a horizontal direction and a vertical direction, and a housing connected to the display. The housing holds a heating element therein and includes an exhaust port formed thereon. The electronic apparatus also has a fan arranged inside the housing. The fan is adapted to exhaust air heated by the heating element. The position of the exhaust port is located at an elevated end portion of the housing in any posture of both the horizontal direction and the vertical direction.

According to a first embodiment, FIG. 1 to FIG. 4 show a portable information apparatus 1. The portable information apparatus 1 comprises a main unit 2 and a display unit 3. The main unit 2 has a flat box shaped first housing 4. The first housing 4 includes a bottom wall 5a, a top wall 5b, left and right side walls 5c, a front wall 5d, and a rear wall 5e. The side walls 5c, front wall 5d, and rear wall 5e constitute peripheral walls of the first housing 4. The top wall 5b supports a keyboard 6.

The side walls 5c and the front wall 5d, and the side walls 5c and the rear wall 5e are adjacent to each other so as to be orthogonal to each other. These side walls 5c, front wall 5d, and rear wall 5e constitute first to fourth corner portions 7a, 7b, 7c, and 7d in corporation with one another. The first to fourth corner portions 7a, 7b, 7c, and 7d are positioned at the four corners of the first housing 4. In other words, the first corner portion 7a is positioned at the front end left side of the first housing 4, and the second corner portion 7b is positioned at the rear end left side of the first housing 4. Similarly, the third corner portion 7c is positioned at the front end right side of the first housing 4, and the fourth corner portion 7d is positioned at the rear end right side of the first housing 4.

A columnar support portion 8 is formed at the rear end portion of the first housing 4. The support portion 8 extends in the widthwise direction of the first housing 4 along the rear end portion of the first housing 4, and a concave portion 9 is formed at a central portion in the longitudinal direction of the support portion 8.

The display unit 3 comprises a second housing 11 and a display 12 being any type of flat panel display as a liquid crystal display panel for example. The second housing 11 is formed in a flat box shape which is substantially equal in size to the first housing 4, and has a front surface 13a, a rear surface 13b, and four peripheral surfaces 13c.

The liquid crystal display panel 12 is arranged in the second housing 11, and a display screen of the display panel 12 is covered with a transparent tablet 14. The tablet 14 has an input surface 16 for executing input operation by using a stylus pen 15 (shown in FIG. 9). The input surface 16 is superimposed on the display screen of the liquid crystal display panel 12, so that the display screen may be transparently visualized through the input surface 16. Thus, the display screen of the liquid crystal display panel 12 is compatible with the input surface 16, and the input surface 16 is exposed outwardly of the second housing 11 through an opening 17 formed on the front surface 13a of the second housing 11.

Figure 3:
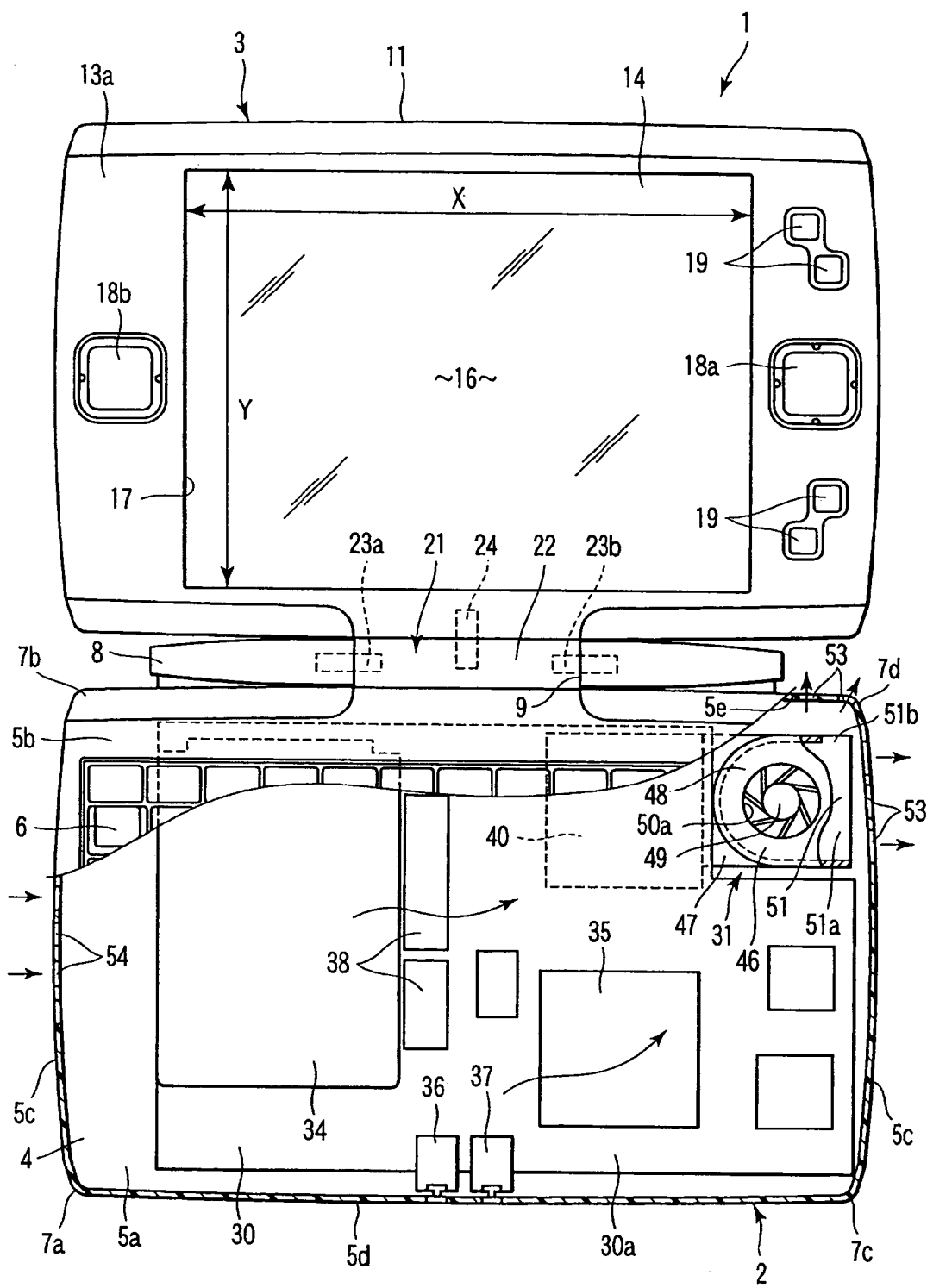
FIG. 3 is an exemplary partially cut away view in a plan of the portable information apparatus showing a positional relationship of heating elements, a fan, exhaust ports, and suction ports in the first embodiment.

As shown in FIGS. 1 and 3, the input surface 16 is formed in a rectangular shape having a first (long) axis X and a second (short) axis Y. The long axis X of the input surface 16 extends along the widthwise direction of the second housing 11, and the short axis Y of the input surface 16 extends along the depth direction of the second housing 11.

A pair of operating keys 18a, 18b, for example, a cross key, and a plurality of determination keys 19 for moving a cursor, for example, or enlarging and reducing the display, are disposed on the front surface 13a of the second housing 11. The operating keys 18a, 18b are disposed to be distributed in the widthwise direction of the second housing 11 between which the input surface 16 is sandwiched, and the determination keys 19 are disposed at positions adjacent to the one operating key 18a.

The second housing 11 is linked with the support portion 8 of the first housing 4 via a hinge unit 21. The hinge unit 21 comprises a hinge body 22, a pair of first hinge axes 23a, 23b collectively serving as horizontal axes, and a second hinge axis 24 serving as a vertical axis. The hinge body 22 is formed in a columnar shape, and pivotally fits into the concave portion 9 of the support portion 8. The hinge body 22 and support portion 8 are arranged coaxially in column along the widthwise direction of the first housing 4.

The first hinge axes 23a, 23b encompass between both end portions each and the support portion 8 along the axial direction of the hinge body 22. The first hinge axes 23a, 23b are formed in a coaxial shape each other, and extend along the widthwise direction of the first housing 4. Thus, the first hinge axes 23a, 23b support the hinge body 22 on the first housing 4 turnably at an angle that is substantially equal to 180 degrees.

The second hinge axis 24 encompasses between the central portion along the axial direction of the hinge body 22 and the second housing 11. The second hinge axis 24 extends in a direction orthogonal to the first hinge axes 23a, 23b. Thus, the second hinge axis 24 supports the second housing 11 on the hinge body 22 reversibly at an angle, which is substantially equal to 180 degrees.

From the above fact, the hinge unit 21 supports the display unit 3 on the main unit 2 pivotally between a closed position and an open position. In addition, when the display unit 3 is at the open position, this display unit 3 is supported on the main unit 2 and can be reversibly rotated at an angle that is substantially equal to 180 degrees about the second hinge axis 24.

In a state in which the display unit 3 is turned at the closed position, the second housing 11 of the display unit 3 lies on the first housing 4 of the main unit 2, and the front surface 13a of the second housing 11 is opposed to the top surface 5b of the first housing 4. Thus, the keyboard 6, the input surface 16 of the tablet 14, the operating keys 18a, 18b, and the determination keys 19 are covered with the first and second housings 4, 11, and the portable information apparatus 1 is folded in a memo book shape.

Figure 6:
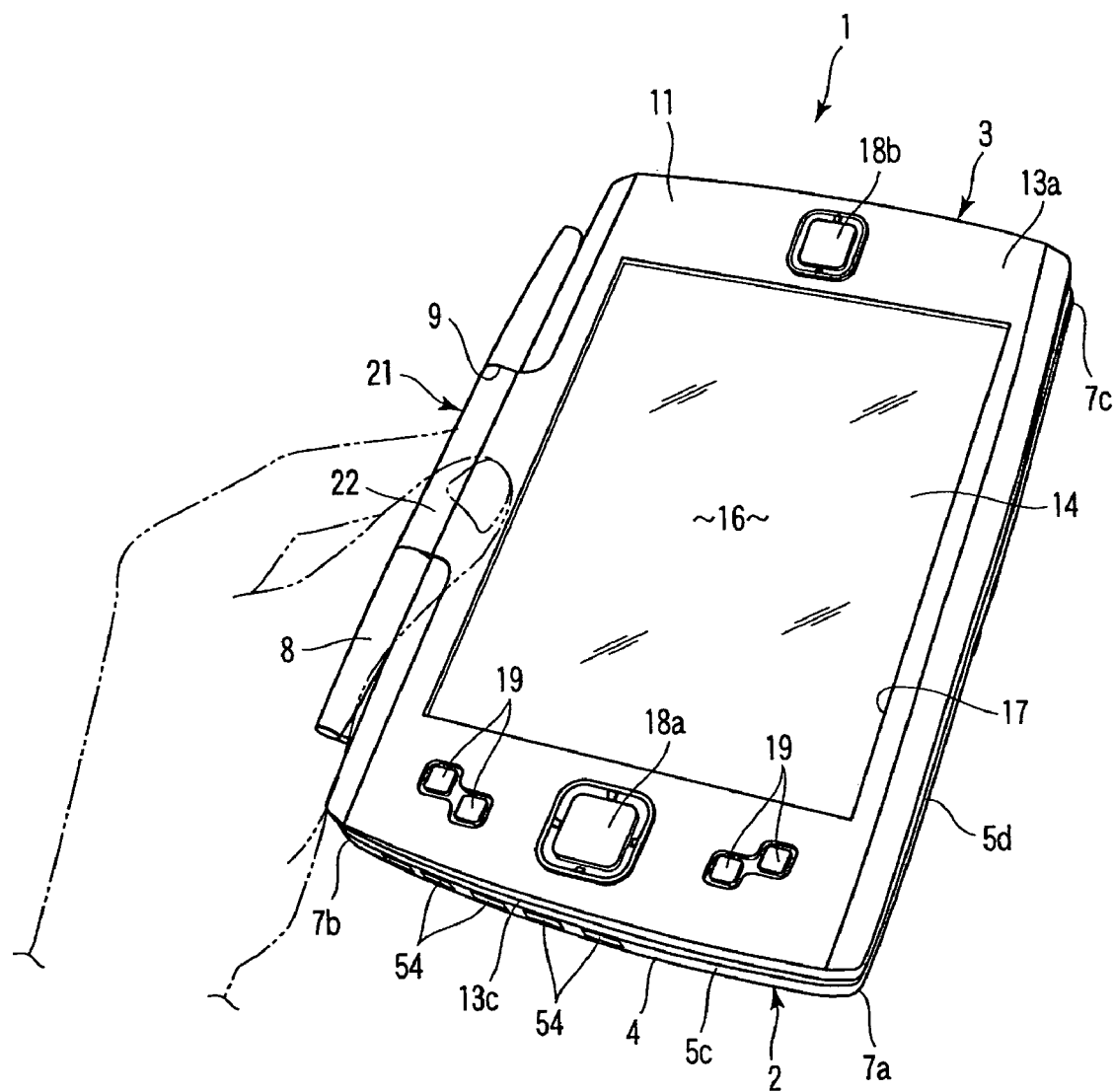
FIG. 6 is an exemplary perspective view of the portable information apparatus showing a state in which the input surface is set in a vertical direction in the first embodiment.
Figure 9:
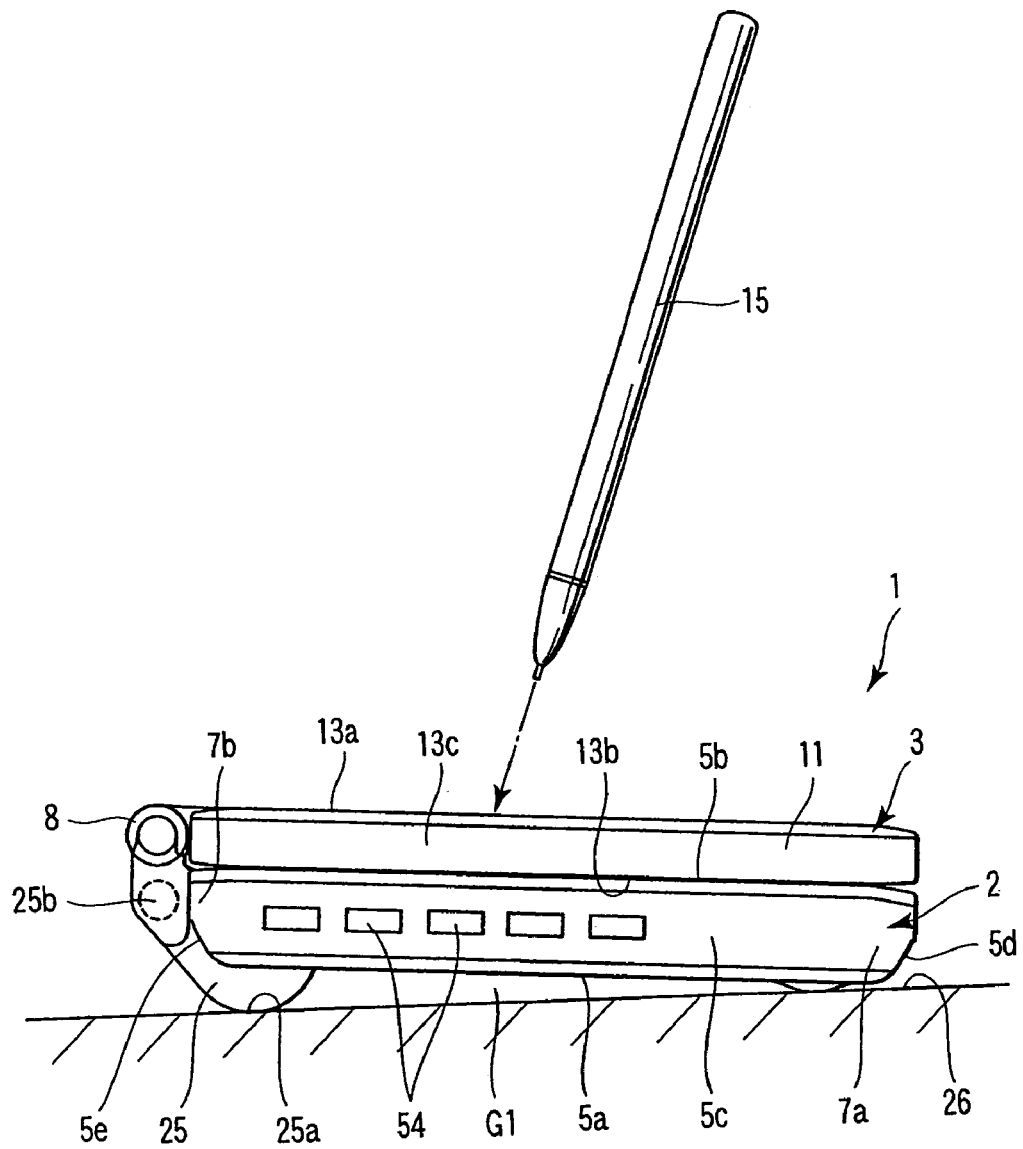
FIG. 9 is an exemplary side view of the portable information apparatus showing a state in which the display unit is reversed in a posture in which the input surface is set in an upward direction, and the main unit is placed on the placement surface in the first embodiment.

On the other hand, at the open position shown in FIG. 1, the display unit 3 is erected from the rear end portion of the main unit 2, and the keyboard 6, the input surface 16 of the tablet 14, the operating keys 18a, 18b, and the determination keys 19 are exposed so as to be visualized from a user. The display unit 3 is reversible in the range of an angle that is substantially equal to 180 degrees around the second hinge axis 24 when the display unit 3 is at the open position. Thus, after the display unit 3 held at the open position has been reversed by 180 degrees around the second hinge axis 24, if the display unit 3 is turned toward the closed position, the display unit 3 lies on the main unit 2 in a posture in which the input surface 16 is oriented upwardly, as shown in FIGS. 6 and 9.

Therefore, the portable information apparatus 1 is folded in a memo book shape in a state in which the first housing 4 and the second housing 11 are integrated with each other. The input surface 16 is touched with the stylus pen 15 or the stylus pen 15 is held close to the input surface 16, thereby making it possible to perform input by handwriting.

Furthermore, the portable information apparatus 1 of this type is designed in size such that the user holding the apparatus may perform input operation by one hand. From this fact, like a general portable computer, the portable information apparatus 1 may select either of a first use mode (refer to FIGS. 1 and 8) for turning the display unit 3 to the open position, thereby executing input operation with the keyboard 6; and a second use mode (refer to FIGS. 6 and 9) for reversing the display unit 3 in a posture in which the input surface 16 is set in an upward direction, thereby executing input operation by using the stylus pen 15.

Figure 5:
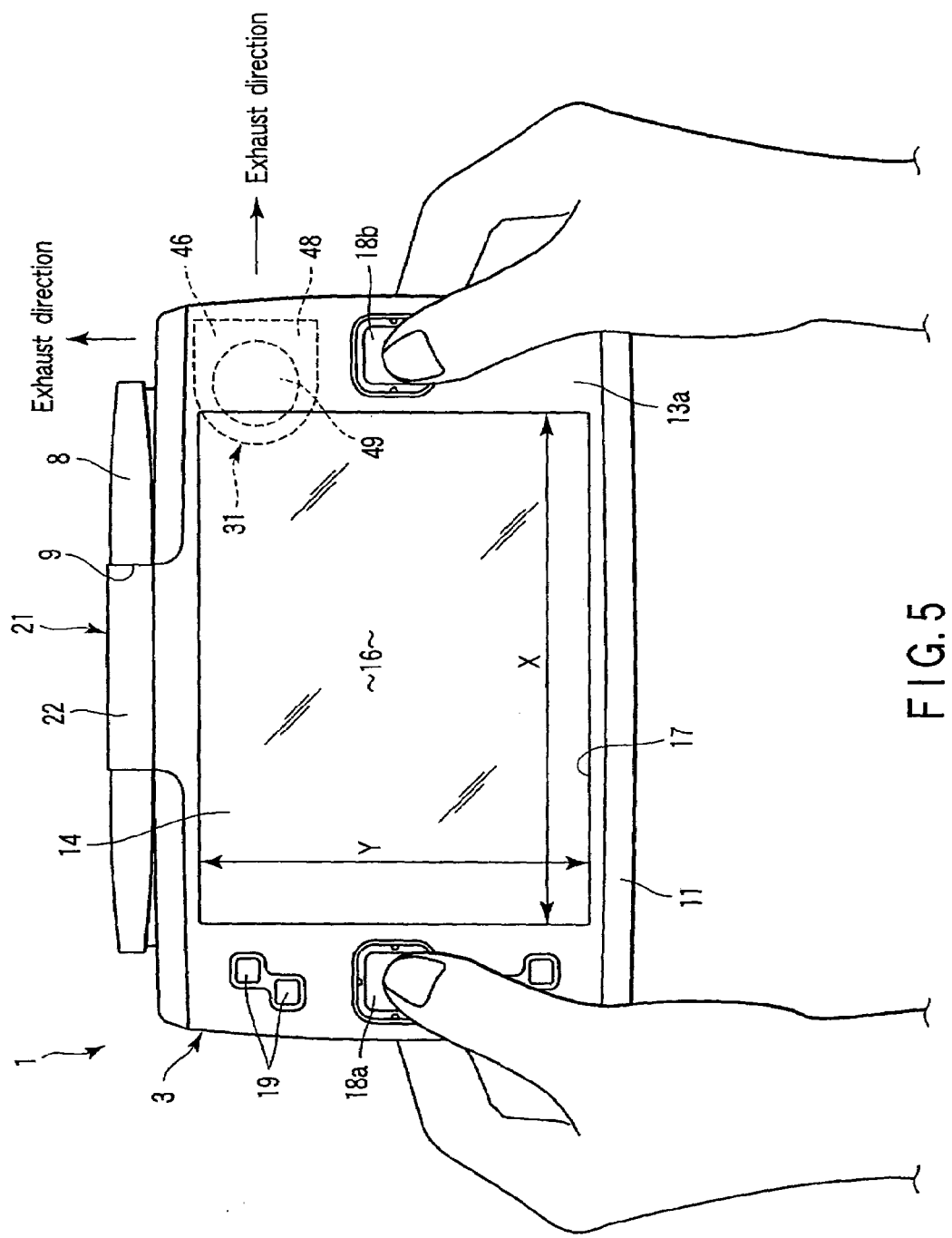
FIG. 5 is an exemplary plan view of the portable information apparatus showing a state in which an input surface is set in a horizontal direction in the first embodiment.
Figure 7:
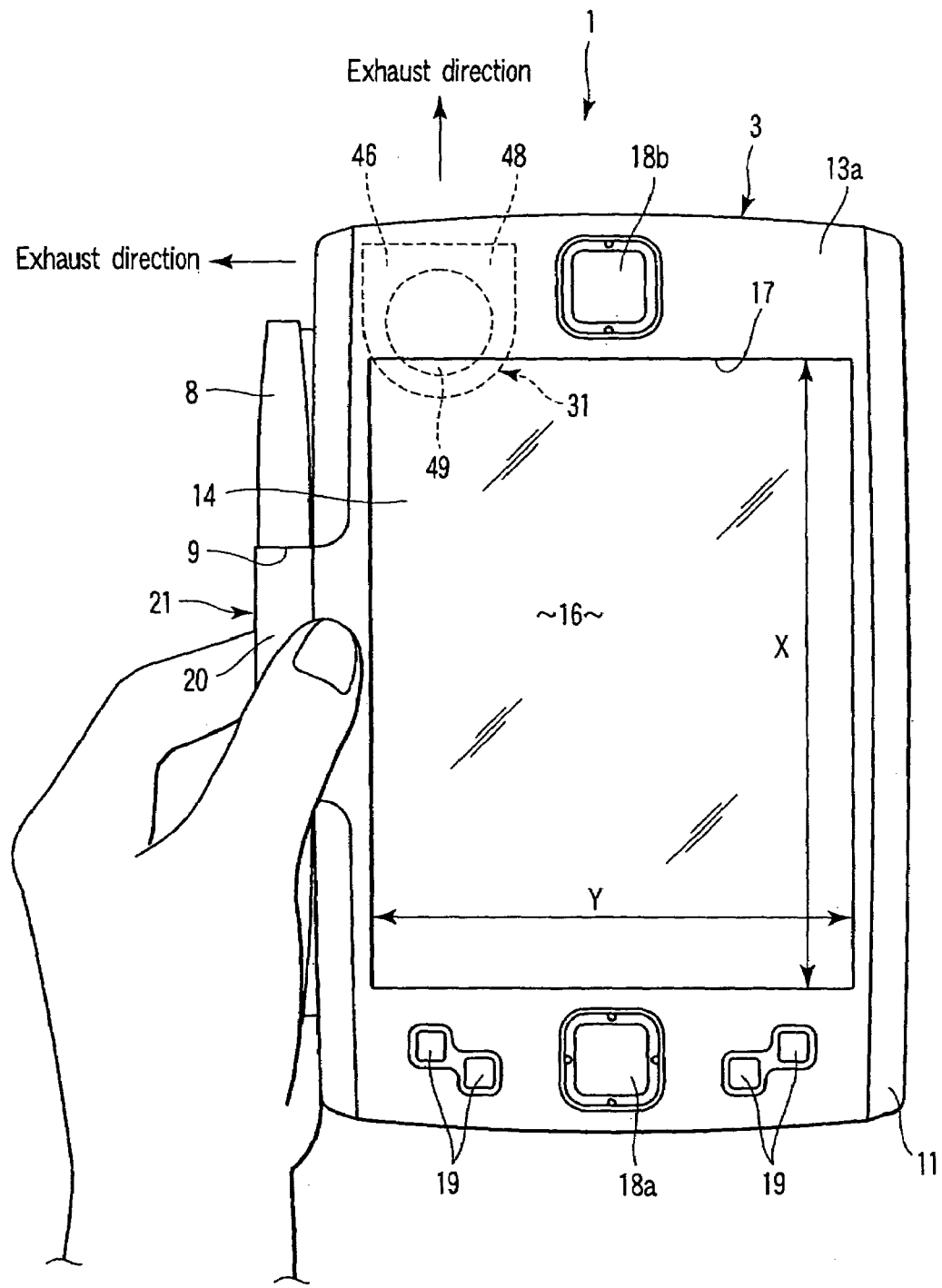
FIG. 7 is an exemplary plan view of the portable information apparatus showing the state in which the input surface is set in the vertical direction in the first embodiment.

In the second use mode, there are two implementations for the portable information apparatus. A first implementation involves the portable information apparatus 1 being used in a posture in which the input surface 16 is set in the horizontal direction. The second implementation involves the portable information apparatus 1 being used in a posture in which the input surface 16 is set in the vertical direction. As shown in FIG. 5, in the case where the input surface 16 is set in the horizontal direction, the long axis X of the input surface 16 is horizontally placed, and the input surface 16 serves as a horizontally elongated screen. As shown in FIGS. 6 and 7, in the case where the input surface 16 is set in the vertical direction, the short axis Y of the input surface 16 is horizontally placed, and the input surface 16 serves as a vertically elongated screen.

Figure 2:
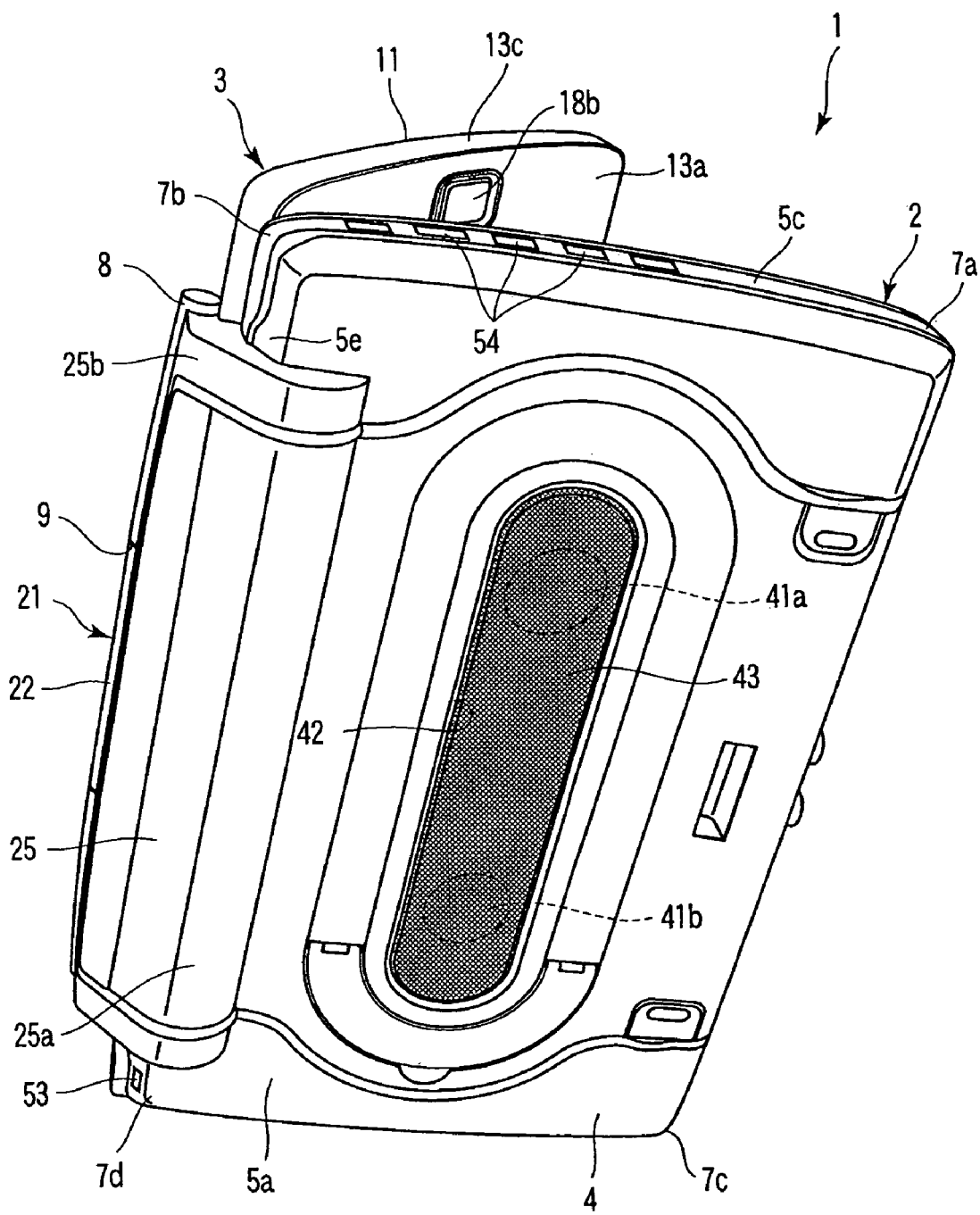
FIG. 2 is an exemplary perspective view of the portable information apparatus when a main unit visualized from a direction of a bottom wall in the first embodiment.

As shown in FIG. 2, the main unit 2 of the portable information apparatus 1 comprises a grip 25 to be used when the portable information apparatus 1 is held by a left hand. The grip 25 is formed integrally at a corner portion defined by the bottom wall 5a and rear wall 5e of the first housing 4, and extends along the widthwise direction of the first housing 4. This grip 25 protrudes from the bottom wall 5a of the first housing 4, and the protrusive end 25a is curved in an arc shape so as to hook a fingertip of a hand.

Further, the grip 25 has an overhang portion 25b that overhangs rearwardly from the rear wall 5e of the first housing 4. The overhang portion 25 continues with the rear end portion of the first housing 4 via the support portion 8. In the second use mode in which the display unit 3 is reversed in a posture in which the input surface 16 is set in an upward direction, the support portion 8 positioned at the rear end portion of the first housing 4 and grip 25 are adjacent to the input surface 16.

As further shown in FIG. 2, the first housing 4 houses a pair of speakers 41a, 41b. The speakers 41a, 41b are disposed in the lower region 32b of the first housing 4, and are opposed to an opening 42 for discharging a sound formed at the central portion of the bottom wall 5a of the first housing 4. The opening 42 opens to the lower region 32b, and is covered with a net shaped speaker cover 43.

Figure 8:
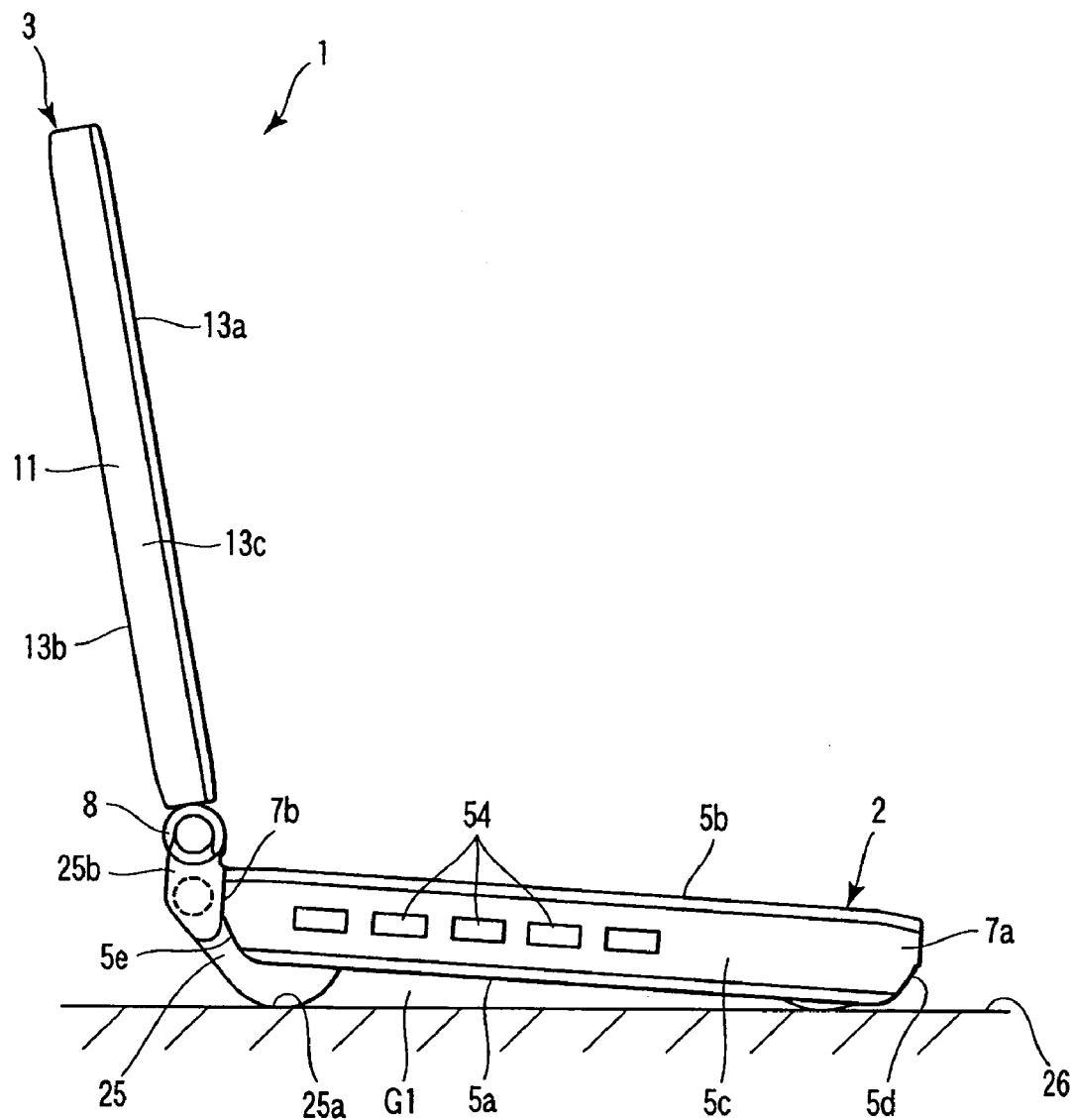
FIG. 8 is an exemplary side view of the portable information apparatus showing a state in which a display unit is opened and stood, and the main unit is placed on a placement surface in the first embodiment.

FIGS. 8 and 9 disclose a state in which the portable information apparatus 1 in each of the first use mode and second use mode is placed on a placement surface 26 such as, for example, a table top of a desk. In this state, the protrusive end 25a of the grip 25 abuts against the placement surface 26 along a full length thereof, and a front end portion of the bottom wall 5a of the first housing 4 abuts against the placement surface 26.

In this manner, in the first use mode, the main unit 2 is tilted in a posture such that the frontal side of the keyboard 6 is lowered, and the operability of the keyboard 6 is improved. In addition, in the second use mode, the main unit 2 and display unit 3 are tilted in a posture such that the frontal side of the input surface 16 is lowered, and the input surface 16 is easily visualized.

Additionally, in any of the above-described first and second use modes, the bottom wall 5a of the first housing 4 is tilted in a direction distant from the placement surface 26 as the bottom wall goes in the direction of the grip 25 from its front end. Thus, a gap G1 is formed between the bottom wall 5a and the placement surface 26.

Figure 4:
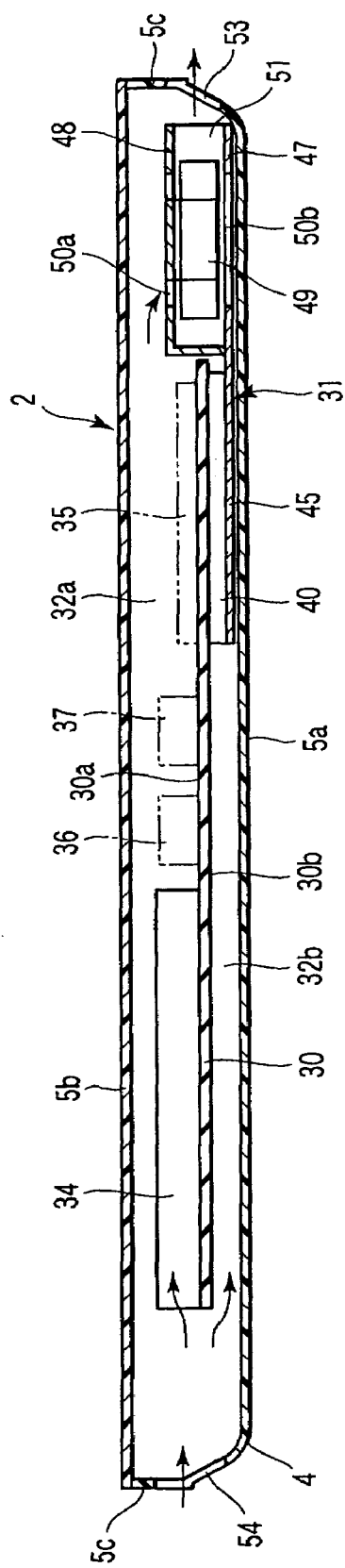
FIG. 4 is an exemplary sectional view of the portable information apparatus showing the positional relationship of the heating elements, the fan, and the suction ports in the first embodiment.

As shown in FIGS. 3 and 4, the first housing 4 houses a printed circuit board 30 and a cooling unit 31. The printed circuit board 30 has a top surface 30a and a lower surface 30b. The top surface 30a of the printed circuit board 30 is opposed to the top wall 5b of the first housing 4 and the keyboard 6, and the lower surface 30b of the printed circuit board 30 is opposed to the bottom wall 5a of the first housing 4. Thus, the printed circuit board 30 divides the inside of the first housing 4 into an upper region 32a and a lower region 32b in a thickness direction.

A hard disk drive unit 34, a chip set 35, a microphone input terminal 36, a head phone output terminal 37, and a plurality of connectors 38 are mounted on the top surface 30a of the printed circuit board 30. These components 34 to 38 each are housed in the upper region 32a inside of the first housing 4. Further, the hard disk drive unit 34 is positioned at the left end portion of the printed circuit board 30, and is adjacent to the side wall 5c at the left side of the first housing 4.

A CPU 40 and a plurality of circuit components (not shown) are mounted on the lower surface 30b of the printed circuit board 30. The CPU 40 and circuit components are housed in the lower region 32b inside of the first housing 4. Further, the CPU 40 is positioned at the rear end portion of the printed circuit board 30, and is adjacent to the fourth corner portion 7d of the first housing 4. The hard disk drive unit 34, chip set 35, and CPU 40 are provided as heating elements which are involved in heating during operation, and positive cooling for maintaining stable operation is required.

The cooling unit 31 is intended to forcibly cool the heating elements such as the hard disk drive unit 34, chip set 35, and CPU 40. This cooling unit 31 comprises a heat receiving plate 45 and a fan 46. The heat receiving plate 45 is made of a metal material having superior heat conductivity such as, for example, an aluminum alloy. The heat receiving plate 45 is interposed between the CPU 40 and the bottom wall 5a of the first housing 4, and is thermally connected to the CPU 40.

The heat receiving plate 45 has a fan support portion 47. The fan support portion 47 is extended from the CPU 40 toward the side wall 5c at the right side of the first housing 4, and is positioned inside of the fourth corner portion 7d.

The fan 46 comprises a fan casing 48 and an impeller 49. The fan casing 48 is made of a metal material having superior thermal conductivity such as, for example, an aluminum alloy. This fan casing 48 is fixed to the top surface of the fan support portion 47.

From this point, in the case of the present embodiment, the heat receiving plate 45 and fan casing 48 are integrated with each other via the fan support portion 47. Thus, part of the heat of the CPU 40 is designed so as to be transmitted from the heat receiving plate 45 to the fan casing 48 via the fan support portion 47.

The impeller 49 is supported on the fan casing 48. This impeller 49 is driven by means of a fan motor (not shown) when the portable information apparatus 1 is powered or when a temperature of the CPU 40 reaches a predetermined value.

The fan casing 48 and the fan support portion 47 of the heat receiving plate 45 each have inlet ports 50a, 50b which open inside of the first housing 4. The inlet ports 50a, 50b open around the rotational center of the impeller 49, and are opposed to each other while the impeller 49 is sandwiched between these ports. One inlet port 50a continues with the upper region 32a inside of the first housing 4, and the other inlet port 50b continues with the lower region 32b inside of the first housing 4.

Further, the fan casing 48 has an outlet port 51 opposite to the outer periphery of the impeller 49. As shown in FIG. 3, the outlet port 51 has a first opening region 51a that opens toward the side wall 5c at the right side of the first housing 4, and a second opening region 51b which opens toward the rear wall 5e of the first housing 4.

When the impeller 49 rotates, the air of the upper region 32a of the first housing 4 is taken from the inlet port 50a by the rotational center of the impeller 49. Similarly, the air of the lower region 32b of the first housing 4 is taken from the inlet port 50b by the rotational center of the impeller 49. The taken air is blown from the outer periphery of the impeller 49 by means of a centrifugal force, cools the fan casing 48 and fan support portion 47, and is then blown from the outlet port 51 in two directions.

As shown in FIGS. 3 and 4, the first housing 4 has a plurality of exhaust ports 53. The exhaust ports 53 are formed with intervals at the rear end portion of the right side wall 5c and at the right end portion of the rear wall 5e communicating with the rear end portion of this side wall 5c. Thus, according to this embodiment of the invention, the exhaust ports 53 are positioned at the fourth corner portion 7d of the first housing 4, and opens toward the right side and rear side of the first housing 4.

Further, the first housing 4 has a plurality of suction ports 54. The suction ports 54 are formed with intervals at the left side wall 5c, and continues with the upper region 32a and the lower region 32b of the first housing 4. These suction ports 54 are positioned at an opposite side on the exhaust ports 53 with a heating element, such as the CPU 40 for example, sandwiched therebetween.

In the portable information apparatus 1 having such a configuration, in the first use mode for executing input operation by using the keyboard 6, as shown in FIG. 8, the main unit 2 is placed on the placement surface 26, and turns the display unit 3 to the open position. At this time, the protrusive end 25a of the grip 25 and the front end of the bottom wall 5a of the first housing 4 abut against the placement surface 26, so that the main unit 2 is tilted in a posture such that the frontal side of the keyboard 6 is lowered. In addition, the gap G1 is formed between the bottom wall 5a of the first housing 4 and the placement surface 26, and the speakers 41a, 41b are lifted from the placement surface 26 by this gap G1. Thus, the sound from the speakers 41a, 41b is discharged to the outer periphery of the portable information apparatus 1 through the gap G1.

Now, a description will be given with respect to the second use mode in which the display unit 3 is reversed in a posture in which the input surface 16 is set in an upward direction.

FIG. 5 discloses a state in which the input surface 16 is set in the horizontal direction, and the portable information apparatus 1 is operated while it is held by both hands. In this state, the display unit 3 superimposed on the main unit 2 such that the input surface 16 is tilted at an angle at which the input surface 16 is easily visualized, and operates the operating keys 18a, 18b or a determination keys 19.

If the main unit 2 and display unit 3 are tilted from a position where the input surface 16 is set in the horizontal direction, the fourth corner portion 7d of the main unit 2 is positioned at the right side portion of the upper (elevated) end of the portable information apparatus 1. Hence, the exhaust ports 53 of the first housing 4 and fan 46 are positioned at the right side portion of the upper (elevated) end of the first housing 4, and the exhaust ports 53 are positioned upwardly and away from a right hand of the user supporting the portable information apparatus 1.

At this time, the exhaust ports 53 positioned at the right side wall 5c open toward the right side of the main unit 2, and the remaining exhaust ports 53 positioned on the rear wall 5e open in a generally upward direction. In addition, the suction ports 54 positioned on the left side wall 5c open toward the left side of the main unit 2.

When the impeller 49 of the fan 46 rotates, since the inside of the first housing 4 is set at a negative pressure, the air outside of the portable information apparatus 1 is suctioned from the suction ports 54 which opens on the right side wall 5c of the first housing 4. This air flows through the upper region 32a and lower region 32b inside of the first housing 4, as indicated by the arrow in FIGS. 3 and 4. In this manner, a horizontally oriented air flow path is formed inside of the first housing 4.

The air flowing the upper and lower regions 32a, 32b cools the heating elements such as the chip set 35 and CPU 40. The air heated by the heat exchange with these heating elements is suctioned by the inlet ports 50a, 50b of the fan casing 48, and is discharged from the outlet port 51 of the fan casing 48 toward the exhaust ports 53. The discharged air is exhausted from the exhaust ports 53 in two directions of the right side and upper side of the first housing 4.

On the other hand, FIGS. 6 and 7 disclose a state in which the grip 25 of the first housing 4 is held by the left hand of a user, and the portable information apparatus 1 is operated while the input surface 16 is vertically oriented. In this state as well, the user maintains the main unit 2 and display unit 3 so that the input surface 16 is tilted at an angle at which the input surface 16 can be easily visualized, and input operation is executed by using the stylus pen 15 with the right hand.

When the input surface 16 is set in the vertical direction, if the main unit 2 and display unit 3 are tilted, the portable information apparatus 1 turns at an angle which is substantially equal to 90 degrees in the counterclockwise direction from the above state of FIG. 3, and the fourth corner portion 7d of the main unit 2 is positioned at the right side portion of the upper (elevated) end of the portable information apparatus 1.

In other words, the exhaust ports 53 of the first housing 4 and the fan 46 are positioned at the left side portion of the upper end of the first housing 4, and the exhaust ports 53 are positioned upwardly above the left hand of the user supporting the portable information apparatus 1. At this time, the exhaust ports 53 positioned on the side wall 5c opens upwardly of the main unit 2, and the remaining exhaust ports 53 positioned on the rear wall 5e open toward the left side of the main unit 2. In addition, the suction ports 54 positioned on the left side wall 5c are positioned at the lower end portion of the main unit 2, and open downwardly.

While the impeller 49 of the fan 46 rotates, the air suctioned from the suction ports 54 to the inside of the first housing 4 flows the upper region 32a and lower region 32b inside of the first housing 4 toward the fan 46. In this manner, the vertically oriented air flow path is formed inside of the first housing 4.

The air flowing the upper and lower regions 32a, 32b cools the heating elements such as the chip set 35 and CPU 40. The air heated by heat exchange with the heating elements is suctioned by the inlet ports 50a, 50b of the fan casing 48, and is discharged from the outlet port 51 of the fan casing 48 toward the exhaust port 53. The discharged air is exhausted from the exhaust ports 53 in two directions of the left side and upper (elevated) side of the first housing 4.

According to such a portable information apparatus 1, in the second use mode in which the display unit 3 is reversed in a posture in which the input surface 16 is set in an upward direction, the fan 46 and exhaust ports 53 are positioned at the upper (elevated) end portion of the first housing 4 in any case in which the input surface 16 is set in the horizontal direction or vertical direction.

Thus, when the heating elements are heated during operation, the air flow direction due to natural convection produced inside of the first housing 4 does not interfere with the air flow direction due to forcible air cooling using the fan 46 each other. In particular, in the case where the input surface 16 is set in the vertical direction, the air flow direction due to natural convection is coincidence with the air flow direction due to forcible air cooling, and the air flow direction is coincident with the opening direction of the exhaust ports 53.

Therefore, the air heated by heat exchange with the heating elements may be efficiently exhausted from the exhaust ports 53 of the first housing 4, and the heat radiation performance of the heating elements is improved. In addition, the air ventilation of the inside of the first housing 4 is improved, and an excessive temperature rise of the first housing 4 may be limited.

Moreover, with the above configuration, when the portable information apparatus 1 is operated while it is held by a hand, in any case in which the input surface 16 is set in the horizontal direction or vertical direction, the exhaust ports 53 are positioned upwardly and away from any hand of the user supporting the portable information apparatus 1. As a result, the hot air exhausted from the exhaust ports 53 is not blown toward the hand, and the user does not receive hot air directly when the portable information apparatus 1 is operated.

In addition, the exhaust ports 53 are formed from the side wall 5c at the right side of the first housing 4 across the rear wall 5e. Thus, an opening area of the exhaust ports 53 increases, and the heated air may be exhausted from the exhaust ports 53 of the first housing 4 in two directions. Therefore, the air heated by heat exchange with the heating elements may be efficiently exhausted to the outside of the first housing 4.

In addition to the structure of the first embodiment, a shutter may be provided at the first housing so as to selectively open and close the exhaust ports of the side wall or the exhaust ports of the rear wall by means of this shutter. By employing this configuration, for example, when the input surface is used in the horizontal direction, if the exhaust ports of the side wall are closed by the shutter, the heated air may be exhausted from only the exhaust ports of the rear wall upwardly of the first housing.

Similarly, for example, when the input surface is used in the vertical direction, if the shutter closes the exhaust ports of the rear wall, the heated air may be exhausted from only the exhaust ports of the side wall upwardly of the first housing.

Thus, the heated air is discharged in a direction distant from a hand supporting the portable information apparatus in any case in which the input surface is set in the horizontal direction or vertical direction, and as a result, heat provided toward the user may be reduced.

Figure 10:
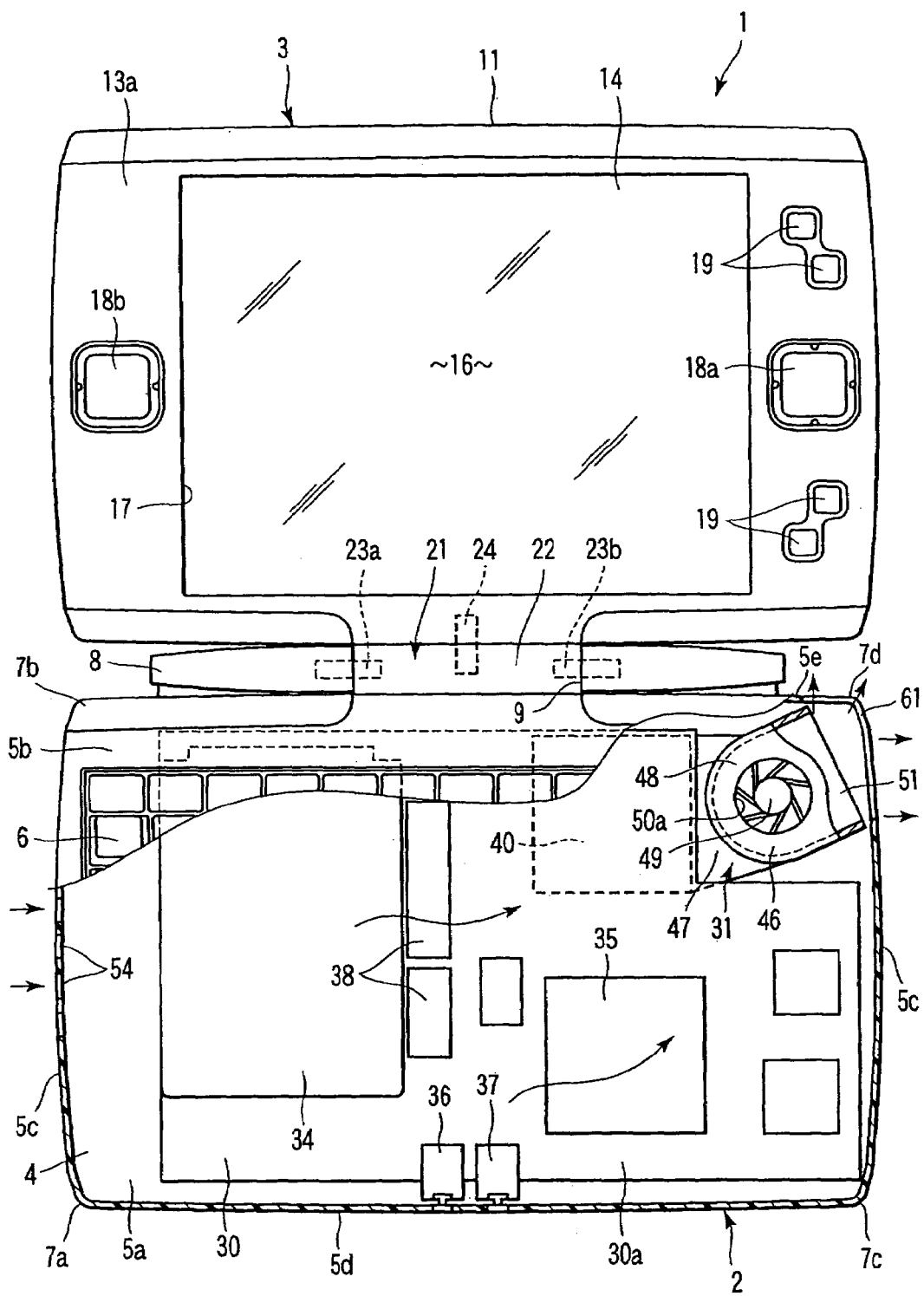
FIG. 10 is an exemplary partially cut away view in a plan of a portable information apparatus showing a positional relationship of heating elements, a fan, exhaust ports, and suction ports in a second embodiment of the present invention.

Further, FIG. 10 shows a second embodiment of the present invention.

The second embodiment is different from the first embodiment in matters regarding the exhaust direction of the air heated by heat exchange with the heating elements. The other constituent elements of the portable information apparatus 1 are similar to those of the first embodiment.

As shown in FIG. 10, the fan 46 is arranged inside of the first housing 4 in a posture in which the outlet port 51 is oriented to the fourth corner portion 7d. In this manner, the outlet port 51 is opposed to each of the rear end portion of the right side wall 5c and the right end portion of the rear wall 5e.

The first housing 4 has an exhaust port 61. The exhaust port 61 is continuously formed from the rear end portion of the right side wall 5e of the first housing 4 across the right end portion of the rear wall 5e, and is opposed to the outlet port 51 of the fan 46.

According to such an implementation, since the outlet port 51 of the fan 46 is opposed to the side wall 5c and rear wall 5e of the first housing 4, the exhaust port 61 may be formed from the side wall 5c across the rear wall 5e. Thus, an opening range of the exhaust port 61 may be increased more than that of the outlet port 51, and the air heated by heat exchange with the heating elements may be efficiently exhausted to the outside of the first housing 4.

Figure 11:
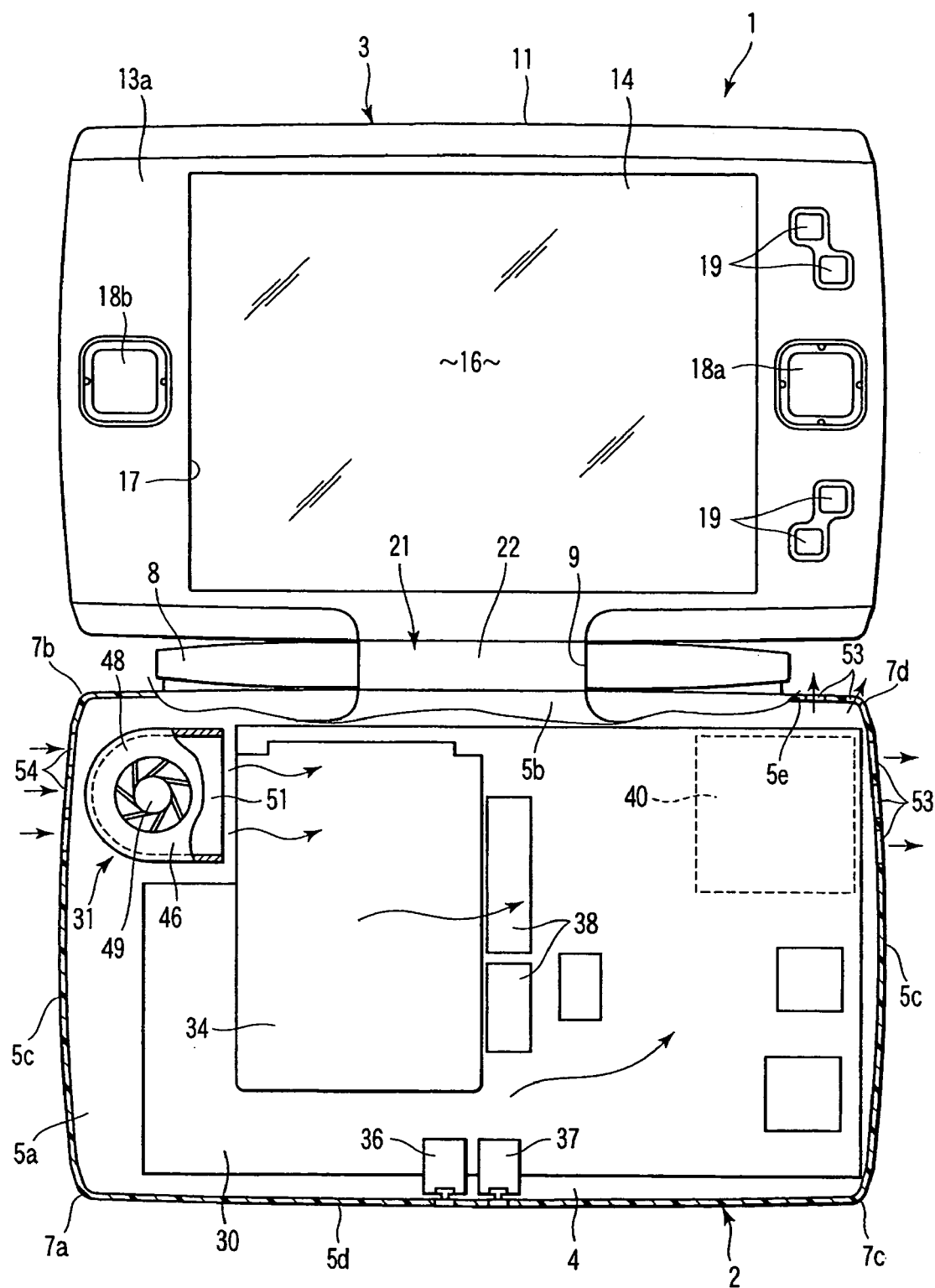
FIG. 11 is an exemplary partially cut away view in a plan of a portable information apparatus showing a positional relationship of heating elements, a fan, exhaust ports, and suction ports in a third embodiment of the present invention.

FIG. 11 shows a third embodiment of the present invention.

In the third embodiment, the fan 46 is placed at the left side portion of the first housing 4, and the inlet port 50a of the fan casing 48 is positioned in the vicinity of the suction ports 54 of the first housing 4. The outlet port 51 of the fan casing 48 opens to the inside of the first housing 4, and the printed circuit board 30 having the heating element such as the CPU 40 mounted thereon is interposed between the outlet port 51 and the exhaust ports 53.

The CPU 40 having a large amount of heat is mounted at the right end portion of the printed circuit board 30, and is positioned at the fourth corner portion 7d of the first housing 4. Thus, in the case of the present embodiment, the CPU 40 is proximate to a plurality of exhaust ports 53, and is thermally isolated from the fan casing 48 of the fan 46.

In such an implementation, when the impeller 49 of the fan 46 rotates, the inside of the first housing 4 is set at a negative pressure, and thus, the air outside of the portable information apparatus 1 is suctioned from the suction ports 54 which opens on the side wall 5c at the left side of the first housing 4. This air is suctioned by the inlet port 50a of the fan casing 48, and is discharged from the outlet port 51 of the fan casing 48 to the inside of the first housing 4.

The air discharged to the inside of the first housing 4 flows the upper region 32a and lower region 32b of the inside of the first housing 4 respectively toward the exhaust ports 53, as indicated by the arrow in FIG. 11. In this manner, a horizontally oriented air flow path is formed inside of the first housing 4.

The air flowing the upper and lower regions 32a, 32b cools the heating element such as the CPU 40. The air heated by heat exchange with this heating element is exhausted from the exhaust ports 53 to the right side and upper side of the first housing 4 when the input surface 16 is set in the horizontal direction. In addition, the heated air is exhausted from the exhaust ports 53 to the left side and upper side of the first housing 4 when the input surface 16 is set in the vertical direction.

The electronic apparatus according to the present invention is not limited to a portable information apparatus, and may be applied even to a portable computer of B5 size, for example, similarly.

Further, the input surface may be formed in a square shape, for example, without being limited to the rectangular shape.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus, comprising:
a housing containing a heating element therein and including an exhaust port formed thereon;
a display including an input surface and pivotably coupled to the housing, the display unit to be used in a first posture with the input surface of the display being oriented in a horizontal direction and a second posture with the input surface of the display being oriented in a vertical direction; and
a fan arranged inside the housing and adapted to exhaust air heated by the heating element;
wherein the position of the exhaust port is located at an elevated end portion of the housing in both postures in which the input surface is set in the horizontal direction and the input surface is set in the vertical direction.

2. An electronic apparatus according to claim 1, wherein the housing includes a suction port formed thereon so that the heating element is positioned between the suction port and the exhaust port.

3. An electronic apparatus according to claim 1, wherein the fan has an inlet port and an outlet port that is oriented to the exhaust port of the housing.

4. An electronic apparatus according to claim 3, wherein the heat element is positioned in an air flow path caused by the fan, between the outlet port of the fan and the exhaust port of the housing.

5. An electronic apparatus according to claim 1, wherein the housing includes a plurality of peripheral walls, and at least two of the peripheral walls have the exhaust port.

6. An electronic apparatus according to claim 5, wherein the two peripheral walls includes a corner portion defined by both of them, the exhaust port is provided at the corner portion, and the outlet port of the fan is oriented to the corner portion.

7. An electronic apparatus according to claim 1, wherein the fan has a metallic fan casing that is thermally connected to the heating element.

8. An electronic apparatus according to claim 1, wherein the housing holds a circuit board that divides the inside of the housing into two regions in a thickness direction and supports the heating element thereon, and air from the suction port to the exhaust port flows both the two regions.

9. An electronic apparatus, comprising:
a hinge unit;
a housing coupled to the hinge unit and maintaining a heating element therein, the housing comprising a first peripheral wall including an exhaust port and a second peripheral wall including a suction port;
a display coupled to the hinge unit and rotationally coupled to the housing, the display including an input surface and adapted for use in both a first posture with the input surface of the display being oriented in a horizontal direction and a second posture with the input surface of the display being oriented in a vertical direction;
a grip provided to the housing; and
a fan arranged inside the housing and adapted to suction air through the suction port and to exhaust air heated by the heating element through the exhaust port;
wherein the position of the exhaust port is located at an elevated end portion of the housing in both postures in which the input surface is set in the horizontal direction and the input surface is set in the vertical direction.

10. An electronic apparatus according to claim 9, wherein the housing includes a third peripheral wall including a second exhaust port, the second exhaust is positioned at a higher elevation than the first peripheral wall when the display is used in the horizontal position.

11. An electronic apparatus, comprising:
a hinge unit;
a housing coupled to the hinge unit, the housing containing a heating element therein and including an exhaust port formed thereon;
a display coupled to the hinge unit and rotationally coupled to the housing, the display configured to be positioned in both a first posture with the display being oriented in a horizontal direction and a second posture with the display being oriented in a vertical direction; and
a fan arranged inside the housing and adapted to exhaust air heated by the heating element, the fan including an inlet port and an outlet port that is oriented to the exhaust port of the housing;
wherein the heat element is positioned in an air flow path caused by the fan between the outlet port of the fan and the exhaust port of the housing and the position of the exhaust port is located at an elevated end portion of the housing in any posture of both the horizontal direction and the vertical direction.

12. An electronic apparatus according to claim 11, wherein the housing includes a suction port formed thereon so that the heating element is positioned between the suction port and the exhaust port.

13. An electronic apparatus according to claim 11, wherein the housing includes a plurality of peripheral walls, and at least two of the peripheral walls have the exhaust port.

14. An electronic apparatus according to claim 13, wherein the two peripheral walls includes a corner portion defined by both of them, the exhaust port is provided at the corner portion, and the outlet port of the fan is oriented to the corner portion.

15. An electronic apparatus according to claim 11, wherein the fan has a metallic fan casing that is thermally connected to the heating element.

16. An electronic apparatus according to claim 11, wherein the housing holds a circuit board that divides the inside of the housing into two regions in a thickness direction and supports the heating element thereon, and air from the suction port to the exhaust port flows both the two regions.

* * * * *